United States Patent
LoRocco et al.

(10) Patent No.: US 8,276,541 B2
(45) Date of Patent: Oct. 2, 2012

(54) ILLUMINATED HUMMINGBIRD FEEDER

(75) Inventors: Paul LoRocco, Dallas, TX (US); Jeff Frey, Landisburg, PA (US)

(73) Assignee: TruGlo, Inc., Richardson, TX (US)

( * ) Notice: Subject to any disclaimer, the term of this patent is extended or adjusted under 35 U.S.C. 154(b) by 100 days.

(21) Appl. No.: 12/830,299

(22) Filed: Jul. 3, 2010

(65) Prior Publication Data

US 2011/0011345 A1   Jan. 20, 2011

Related U.S. Application Data

(60) Provisional application No. 61/226,021, filed on Jul. 16, 2009.

(51) Int. Cl.
*A01K 39/02* (2006.01)

(52) U.S. Cl. ........................................................ 119/72

(58) Field of Classification Search ................. 119/52.2, 119/57.8, 72, 428, 429, 452; 340/815.73, 340/815.74, 815.75; 362/84, 363
See application file for complete search history.

(56) References Cited

U.S. PATENT DOCUMENTS

| | | | |
|---|---|---|---|
| 3,564,233 A * | 2/1971 | Cox et al. ........................ 40/444 |
| 3,193,527 A | 10/1975 | Kilham | |
| 5,422,797 A * | 6/1995 | Shattan ........................... 362/123 |
| 5,579,429 A * | 11/1996 | Naum ............................ 385/143 |
| 5,683,762 A * | 11/1997 | Banschick ........................ 428/4 |
| 6,039,453 A * | 3/2000 | Wang ............................ 362/101 |
| D454,669 S | 3/2002 | Lieb | |
| 7,073,932 B2 * | 7/2006 | Wainwright ................. 362/565 |
| 7,080,931 B2 * | 7/2006 | Kao ............................ 362/567 |
| 7,448,347 B2 | 11/2008 | Richmond | |
| 7,861,671 B2 * | 1/2011 | Carter et al. .................... 119/72 |
| 2005/0257749 A1 * | 11/2005 | Kuelbs ........................ 119/57.8 |
| 2006/0152946 A1 | 7/2006 | Chien | |
| 2007/0221133 A1 | 9/2007 | Richmond | |
| 2008/0029035 A1 | 2/2008 | Gou | |
| 2008/0035068 A1 | 2/2008 | Gou | |
| 2008/0102197 A1 | 5/2008 | Chen et al. | |

* cited by examiner

*Primary Examiner* — Rob Swiatek
*Assistant Examiner* — Ebony Evans
(74) *Attorney, Agent, or Firm* — Alvin R. Wirthlin

(57) ABSTRACT

An illuminated bird feeder, such as a hummingbird feeder, includes a housing portion for holding a quantity of liquid, a hanger portion associated with the housing portion for suspending the hummingbird feeder from a support, and a feeder portion with at least one artificial feeding flower fluidly connected to the housing portion. At least one light emitting member in the form of a fluorescent-doped optical fiber is associated with the at least one artificial feeding flower for sighting the hummingbird feeder in low light conditions.

18 Claims, 12 Drawing Sheets

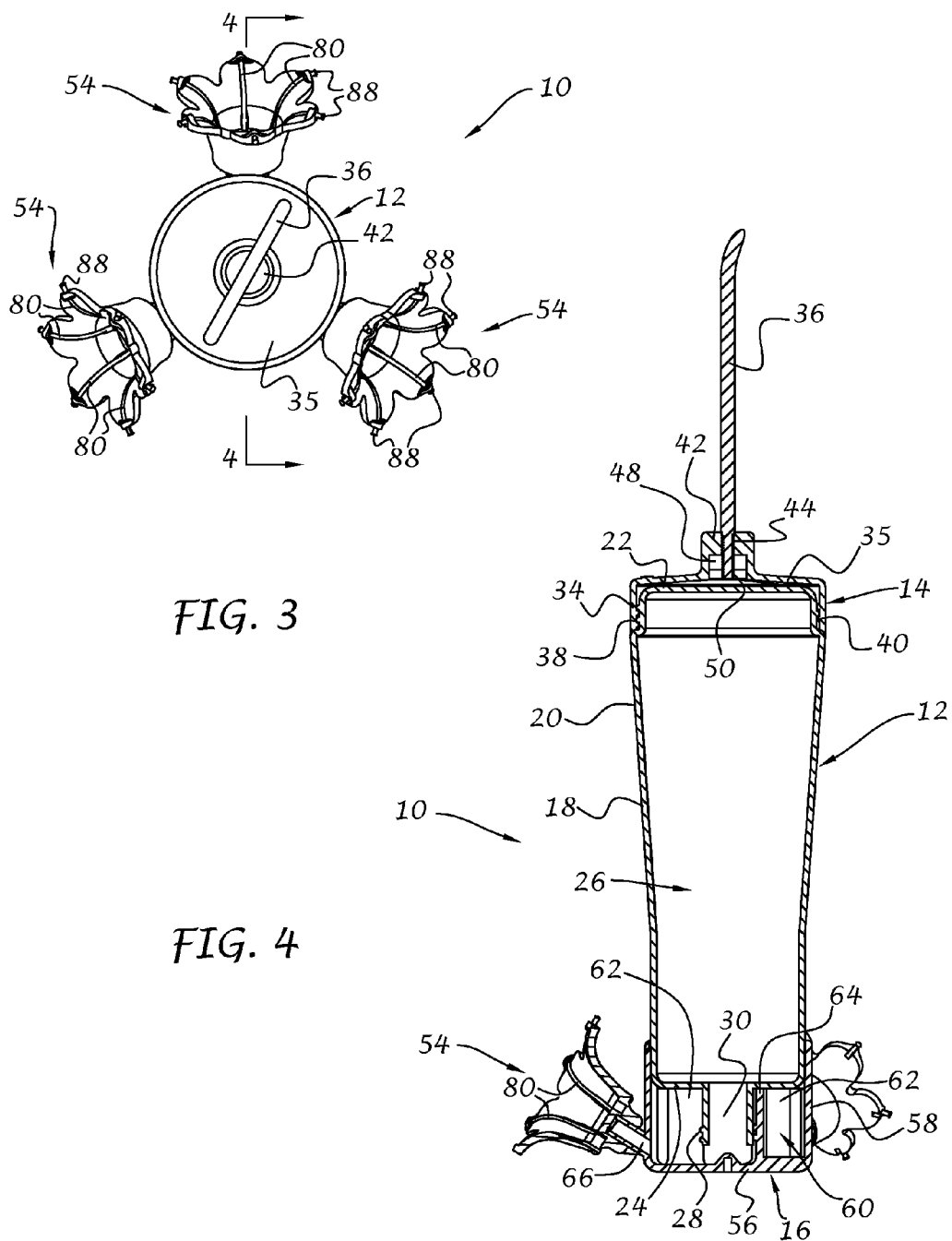

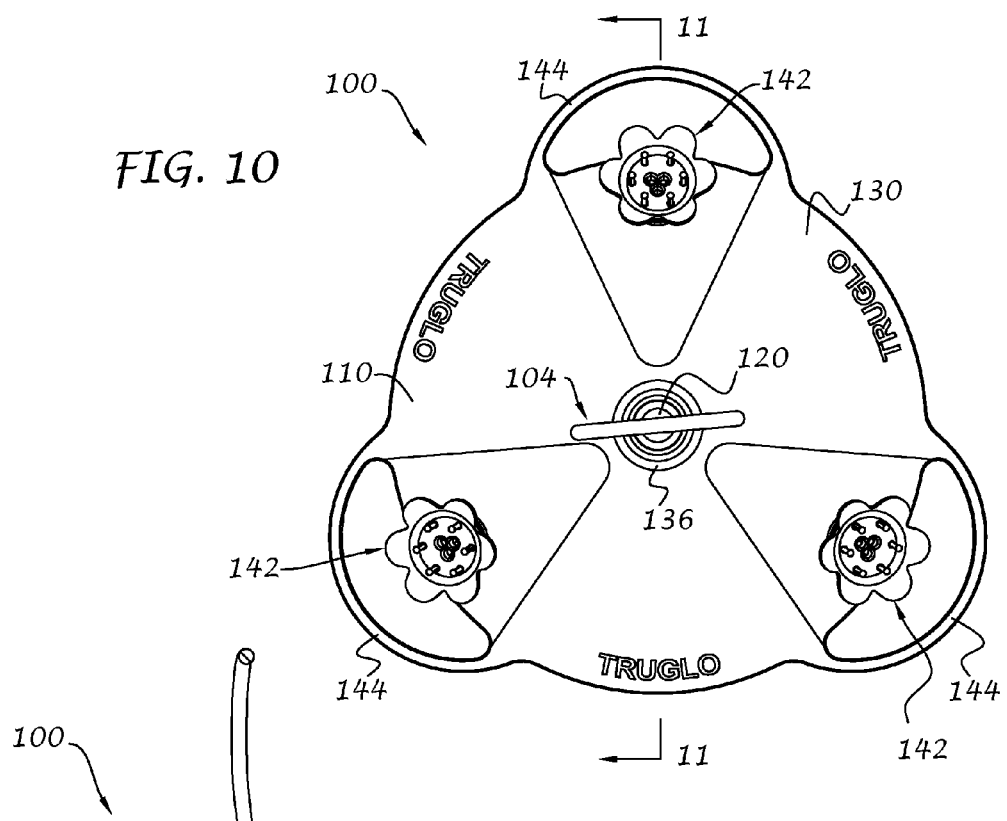
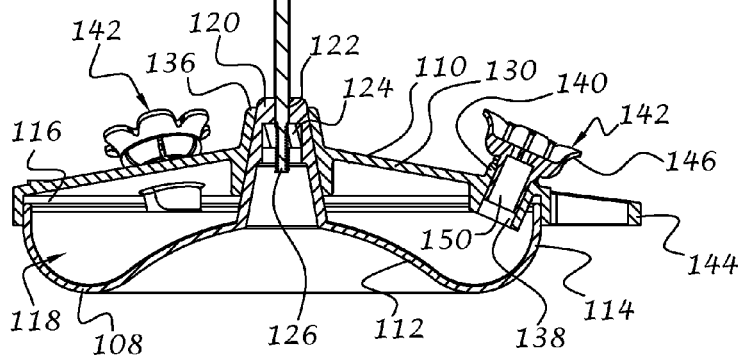

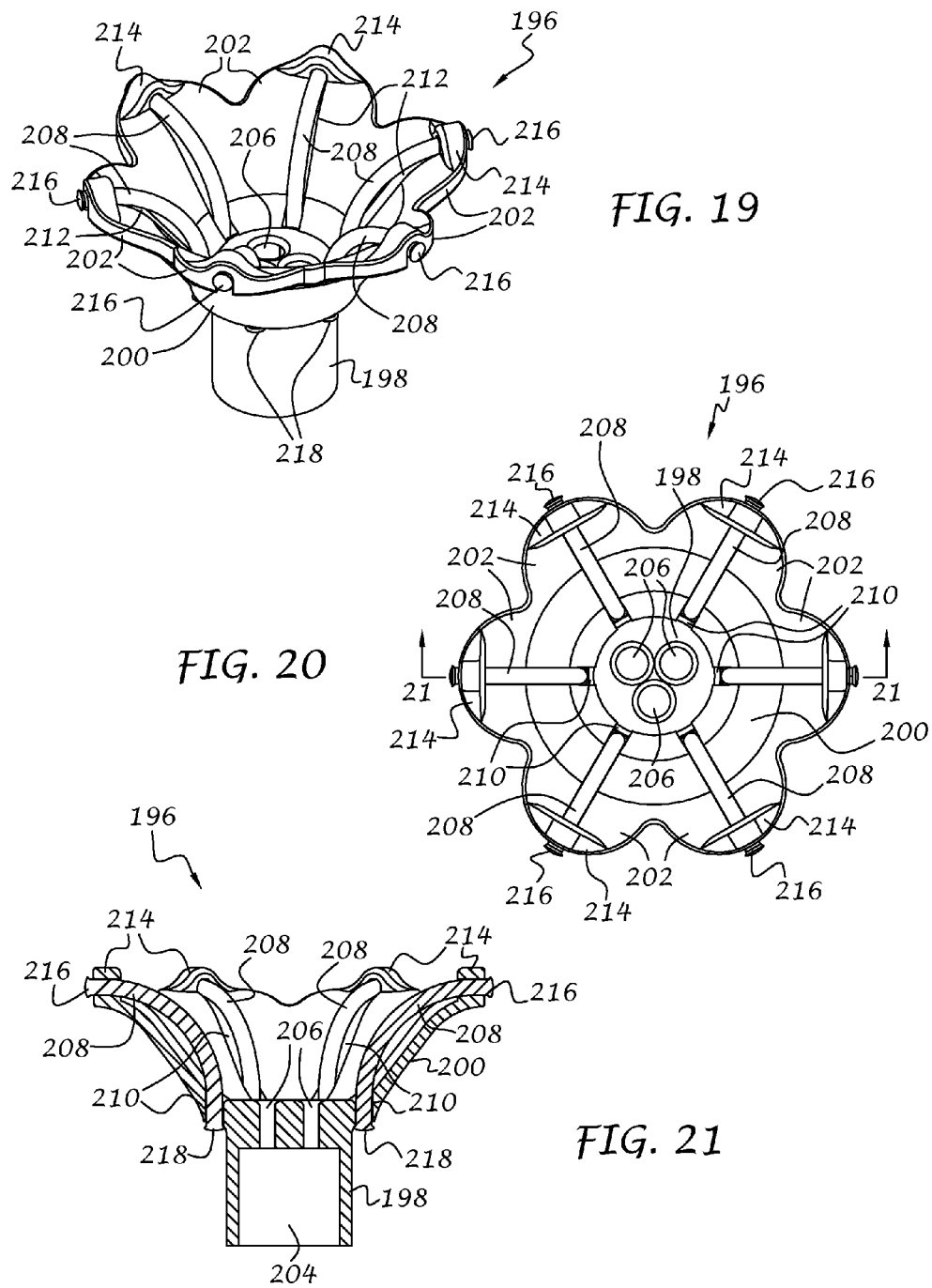

ILLUMINATED HUMMINGBIRD FEEDER

CROSS REFERENCES TO RELATED APPLICATIONS

This application claims the benefit of U.S. Provisional Application No. 61/226,021 filed on Jul. 16, 2009, the disclosure of which is hereby incorporated by reference.

BACKGROUND OF THE INVENTION

This invention relates generally to bird feeders, and more particularly to hummingbird feeders with illumination features.

Commercially available hummingbird feeders have been offered for sale since the late 1940's or early 1950's, although the suggestion of using glass bottles for feeding hummingbirds dates back to the 1920's. Once such early feeder included a single-piece glass-blown body that housed a sugar solution and operated under vacuum to deliver the solution on demand to the hummingbird. Since then, hummingbird feeders have been offered in a wide variety of shapes, styles and sizes.

More recently, hummingbird feeders have been introduced with electrical lighting features to illuminate the contents of the feeder and/or serve as a hanging lantern during nighttime hours. Such feeders typically include an electrical assembly having a solar panel, a rechargeable battery connected to the solar panel, and a plurality of LED's connected to the battery. A photosensor may also be provided to detect dark and daylight conditions to turn on and off the LED's, respectively. Although such devices may be suitable for their intended purposes, the number of additional parts with their associated accumulative costs and relatively lengthy assembly processes over traditional hummingbird feeders contribute to drive up the final product price tag. In an economically challenged climate with increasingly frugal consumers, the price tag of such devices may be above the budget of many bird lovers.

Accordingly, it would be desirous to provide illuminated hummingbird feeders that do not rely on the more costly electrical assemblies of the prior art.

SUMMARY OF THE INVENTION

In accordance with one aspect of the invention, an illuminated hummingbird feeder includes a housing portion for holding a quantity of liquid and a feeder portion with at least one artificial feeding flower fluidly connected to the housing portion. At least one light emitting member is associated with the at least one artificial feeding flower.

In accordance with a further aspect of the invention, an illuminated bird feeder includes a housing for holding and dispensing a quantity of food. At least one passive illumination device is connected to the bird feeder for illuminating a portion of the bird feeder.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein:

FIG. 3 is a bottom plan view thereof;

FIG. 4 is sectional view of the illuminated hummingbird feeder taken along line 4-4 of FIG. 3;

FIG. 10 is a top plan view thereof;

FIG. 11 is sectional view of the illuminated hummingbird feeder taken along line 11-11 of FIG. 10;

FIG. 19 is a top isometric view of an illuminated flower that forms part of the hummingbird feeder of FIG. 15;

FIG. 20 is top plan view of the illuminated flower; and

FIG. 21 is a sectional view of the illuminated flower taken along line 21-21 of FIG. 20;

It is noted that the drawings are intended to depict exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
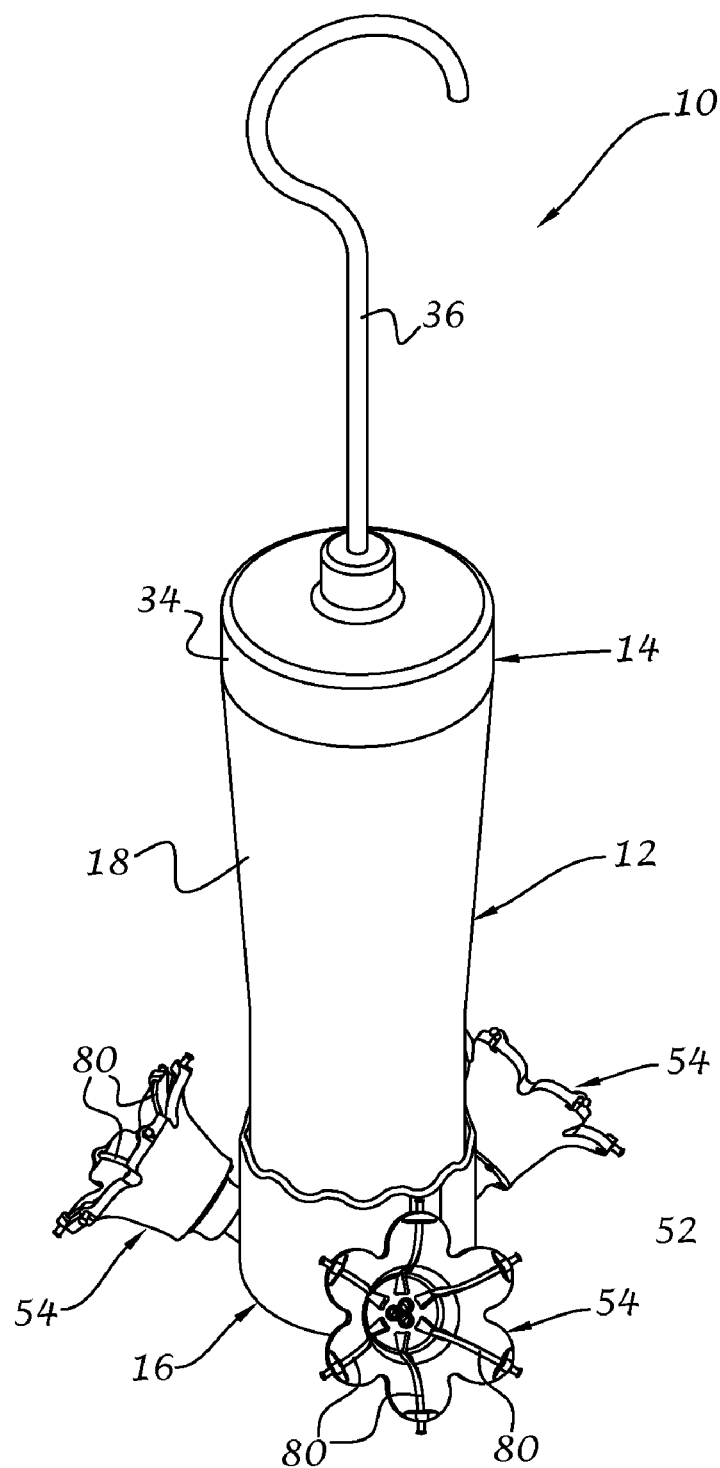
FIG. 1 is a top isometric view of an illuminated hummingbird feeder in accordance with one embodiment of the present invention.
Figure 2:
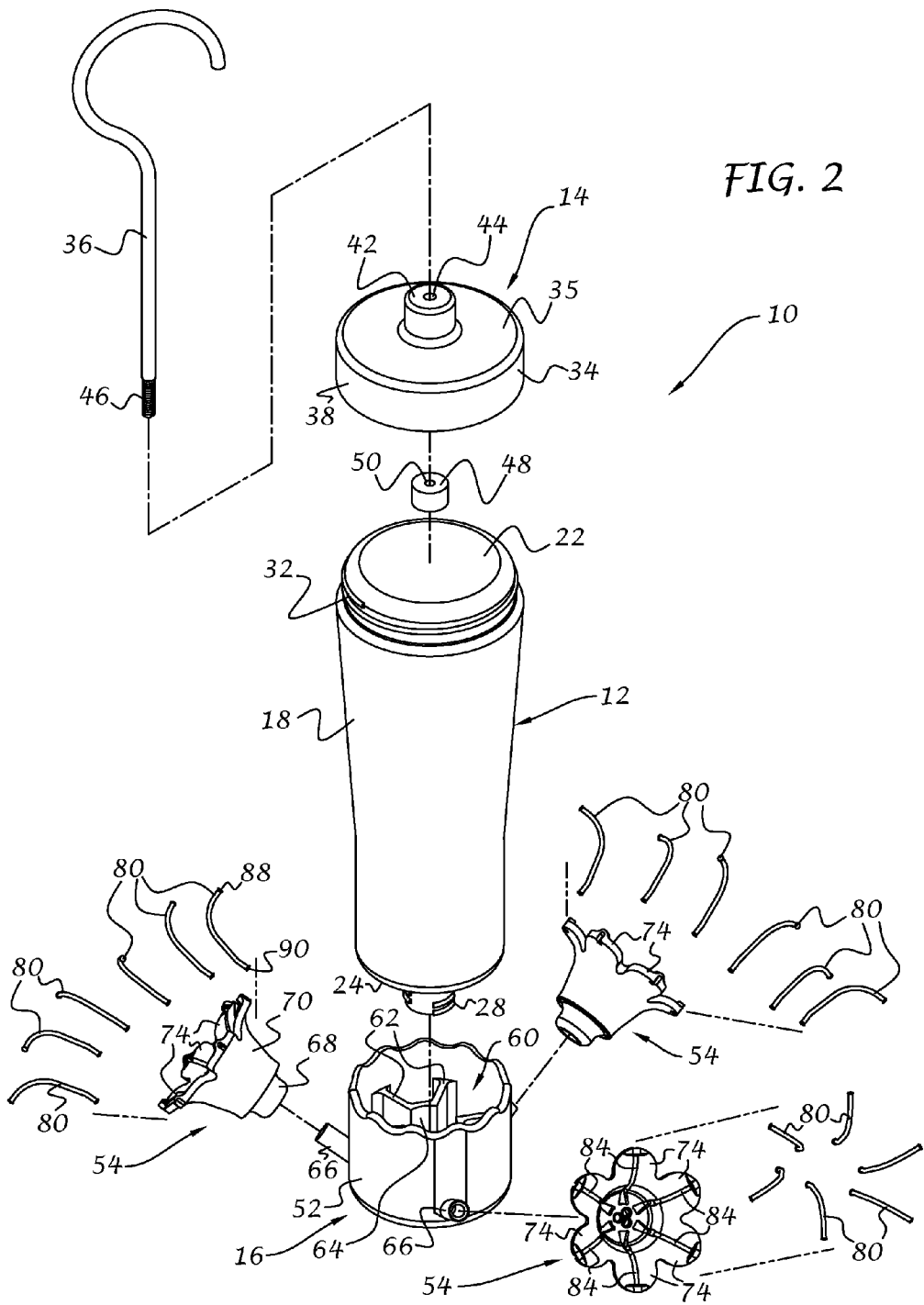
FIG. 2 is an exploded top isometric view thereof.

Referring to the drawings, and to FIGS. 1-4 in particular, an illuminated hummingbird feeder 10 in accordance with one embodiment of the present invention is illustrated. The hummingbird feeder 10 preferably includes a housing portion 12, a hanger portion 14 extending upwardly from the housing portion, and a feeder portion 16 positioned at a lower end of the housing portion.

The housing portion 12 preferably includes an elongate container 18 with a continuous side wall 20 (FIG. 4) extending between a top wall 22 and a bottom wall 24 to form a hollow interior 26 (FIG. 4) for holding a quantity of nectar or other liquids or food for hummingbirds or the like. A threaded neck 28 extends downwardly from the bottom wall 24 and includes a bore 30 that communicates with the hollow interior 26 for distributing a quantity of food to the feeder portion 16. An upper end of the side wall 20 is preferably formed with external threads 32 for receiving the hanger portion 14. The housing portion 12 can be made of any suitable material such as plastic, glass, metal, and so on. In one preferred embodiment of the invention, the housing portion 12 is constructed of a transparent or translucent plastic material through blow-molding or other forming techniques so that the level of food within the hollow interior 26 can be ascertained.

The hanger portion 14 preferably includes an upper cap 34 and a hook 36 extending upwardly from the cap. The cap 34 has an upper wall 35 and a continuous side wall 38 that extends downwardly from the upper wall. The side wall 38 is formed with internal threads 40 for engaging the external threads 32 of the container 18 to releasably hold the components together. A hollow post 42 extends upwardly from the center of the upper wall 35. A threaded bore 44 is formed centrally in the post 42 for engaging external threads 46 (FIG. 2) formed at the lower end of the hook 36. A washer 48 is located within the hollow post 42 and includes a threaded bore 50 for engaging the threads 46 of the hook 36.

The feeder portion 16 preferably includes a lower receptacle 52 connected to a lower end of the container 18 and a plurality of artificial feeding flowers 54 extending upwardly and outwardly from the receptacle 52. The receptacle 52 has a lower wall 56 and a continuous side wall 58 extending upwardly from the lower wall to form a hollow interior 60 (FIGS. 2 and 4) into which the lower end of the container 18 is received. A level of sugar water, nectar or other food is maintained in the receptacle 52 for distribution to the flowers 54. A pair of ribs 62 extend from diametrically opposite sides of the opposite ends of the side wall 58 and converge toward the center of the receptacle 52. Each rib pair 62 terminates at a threaded wall 64. The opposing threaded walls 64 form a threaded opening for engaging the threaded neck 28 of the container 18. In this manner, the feeder portion 16 can be removably installed on the housing portion 12. Tubes 66 are arranged circumferentially around the receptacle 52. Each tube preferably extends radially outwardly and upwardly from a lower end of the side wall 58 and is in fluid communication with the hollow interior 60 of the receptacle 52. Each tube 66 is adapted to receive one of the artificial feeding flowers 54.

Figure 5:
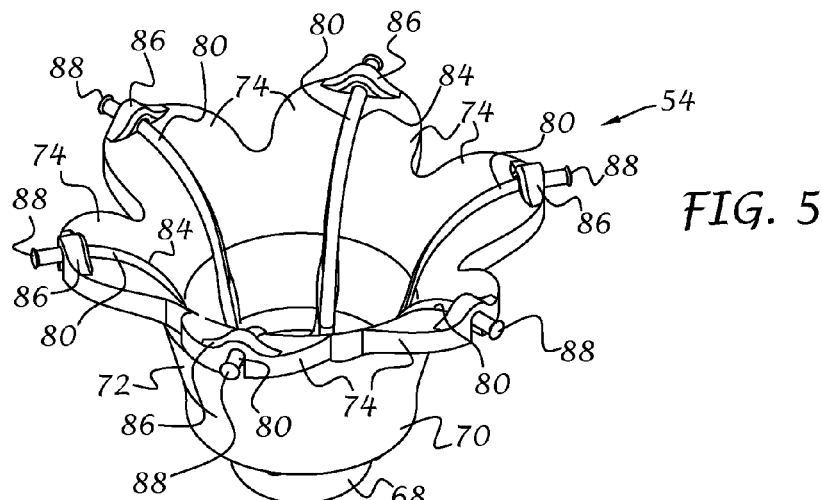
FIG. 5 is a top isometric view of an illuminated flower that forms part of the hummingbird feeder of FIG. 1.
Figure 6:
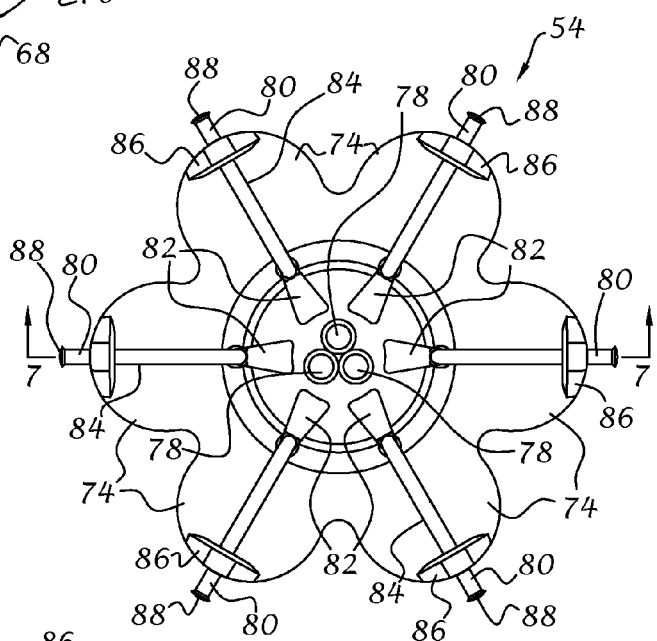
FIG. 6 is top plan view of the illuminated flower.
Figure 7:
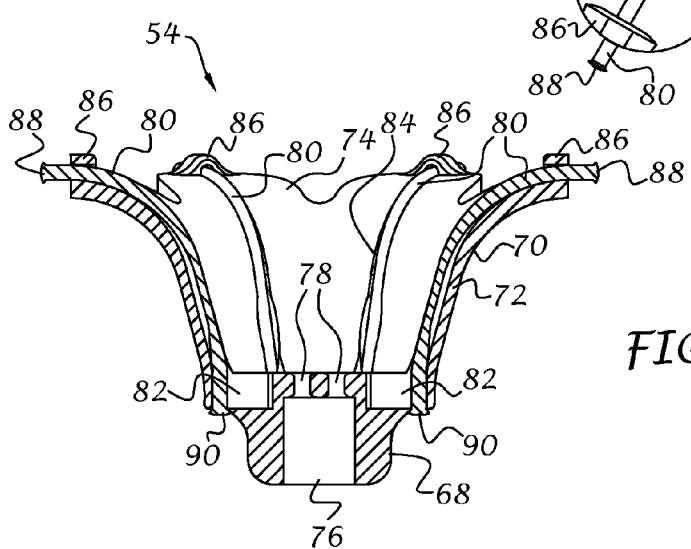
FIG. 7 is a sectional view of the illuminated flower taken along line 7-7 of FIG. 6.

With particular reference to FIGS. 2 and 5-7, each artificial feeding flower 54 preferably includes an annular base or stem portion 68 and a flower portion 70 formed as a continuous side wall that extends upwardly and outwardly from the stem portion. The upper end of the side wall is shaped to form petals 74 that preferably curve radially outwardly and upwardly. The stem portion preferably includes a bore 76 sized to receive one of the tubes 66 in a frictional fit. It will be understood that the flower 54 can be connected to the tube 66 through other connection means such as adhesives, mechanical fasteners, and so on. The bore 76 is in fluid communication with the hollow interior 60 of the receptacle 52 for receiving nectar or the like from the container 18. A plurality of apertures 78 communicate with the bore 76. The apertures 78 are sized to receive the beak of a hummingbird or the like (not shown) so that food available in the bore 76 can be accessed.

A passive illumination device, such as light emitting element 80, is preferably associated with each petal 74. Each light emitting element is preferably in the form of an elongate fluorescent-doped optical fiber that extends through a slot 82 formed in the stem portion 68 and along a groove 84 formed in the petal 74. A retaining block 86 extends across each groove 84 to retain the optical fiber within the groove 84. Opposing ends 88, 90 of each optical fiber 80 are preferably enlarged by heating the ends to retain the fiber optic on the flower 54 and create a lens for projecting light at a greater conical angle out of the fiber optic for an enhanced lighting effect.

A suitable fluorescent-doped optical fiber may be constructed of a polystyrene-based core containing one or more fluorescent dopants that is surrounded by a polystyrene, polymethyl methacrylate, or fluoropolymer cladding. The fluorescent dopants are available in a wide variety of colors and can be incorporated into the core material at different concentrations to give a wide selection of colors and light intensity for the hummingbird feeder. When such an optical fiber receives radiation along its length, energy is absorbed in the optical fiber at a certain wavelength and is re-emitted at both ends of the optical fiber at a longer wavelength. Thus, depending on the amount of radiation absorbed by the optical fiber along its length and the concentration of fluorescent dopant within the core material, a proportionate amount of radiation is emitted at the ends of the optical fiber. Although the optical fiber is preferably circular in cross section, it is contemplated that other cross sectional shapes such as oval, triangular, rectangular, arcuate, etc., may be used. Moreover, it will be understood that the light emitting element 80 is not limited to the particular material as set forth in the exemplary embodiment. The core and cladding may be formed out of any suitable transparent or translucent materials. The cladding material itself may be air surrounding the core material.

With the above-described arrangement, the light emitting elements 80 of the artificial feeding flowers 54 of the hummingbird feeder 10 are exposed to ambient light, such as from the sun or nearby artificial light sources, to thereby illuminate each end 88, 90. The illuminated ends 88, 90 will appear as point sources of light on each petal 74 without the need for solar panels, batteries or other electrical power supplies. This effect is especially noticeable during low light ambient conditions such as at dusk or dawn. However, it will be understood that one or more passive illumination features may be in the form of tritium capsules, glow material, and so on. Active illumination features such as LED's or incandescent bulbs that may require a power source may also or alternatively be used. It will be further understood that more or less light emitting elements may be associated with the flowers 54.

Figure 8:
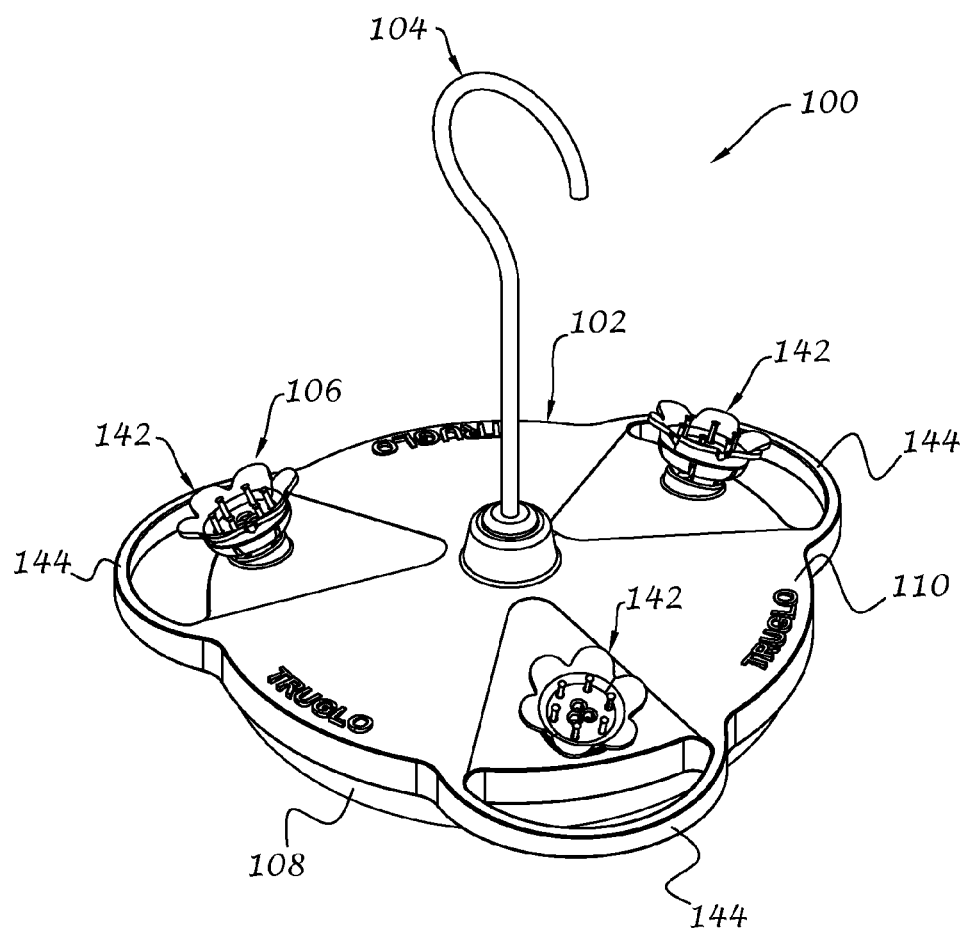
FIG. 8 is a top isometric view of an illuminated hummingbird feeder in accordance with a further embodiment of the present invention.
Figure 9:
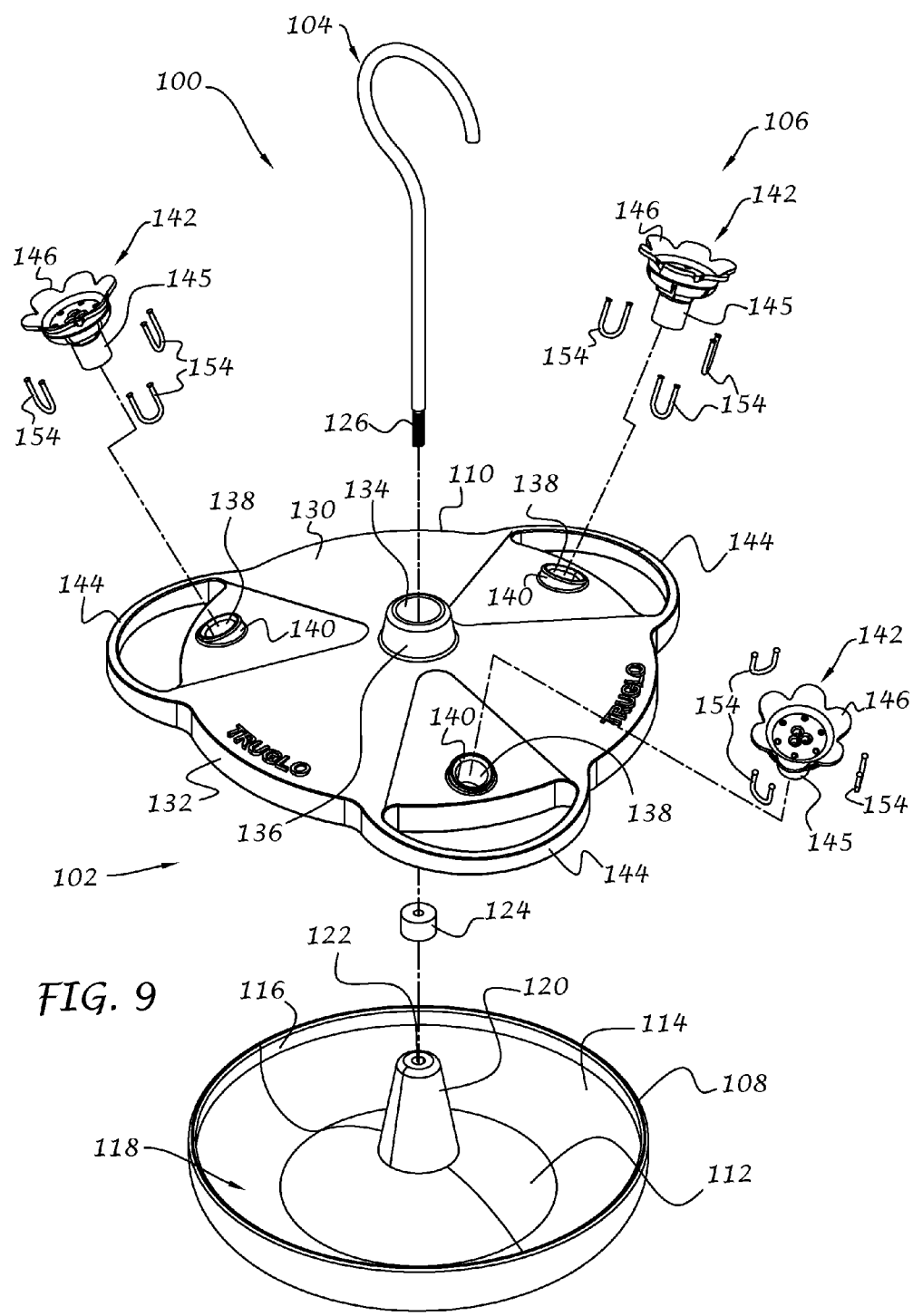
FIG. 9 is an exploded top isometric view thereof.

Referring now to FIGS. 8-11, a hummingbird feeder 100 in accordance with a further embodiment of the present invention is illustrated. The hummingbird feeder 100 preferably includes a housing portion 102, a hanger portion 104 extending upwardly from the housing portion, and a feeder portion 106 incorporated within the housing portion.

The housing portion 102 preferably includes a lower container section 108 removably connected to an upper container section 110. The lower container section 108 is preferably dish-shaped and includes a concave bottom wall 112 and a convex annular side wall 114 extending upwardly from the bottom wall to create a hollow interior 118 (FIG. 11) for receiving nectar or the like. An annular flange 116 extends upwardly from the side wall 114 for receiving the upper container section 110. A hollow frusto-conical support 120 extends upwardly from a center of the bottom wall 112. A threaded bore 122 extends through the support and a threaded washer 124 is located within the support for engaging the lower threaded end 126 of the hook-shaped hanger portion 104 to secure the hanger portion to the lower container section 108.

The upper container section 110 preferably includes an upper wall 130 and an annular side wall 132 that extends downwardly from the upper wall. When the upper and lower container sections are assembled, the side wall 132 preferably fits snugly over the annular flange 116. A central opening 134 is formed in the upper wall 130 and a frusto-conical projection 136 surrounds the opening. The projection 136 is shaped to receive the frusto-conical support 120 of the lower container section 108. A plurality of feeder openings 138 are formed in the upper wall 130. An annular mounting flange 140 surrounds each feeder opening 138 and preferably extends above and below the upper wall 130 at an angle. Each opening 138 and associated flange 140 are sized to receive an artificial feeding flower 142 of the feeder portion 106. A handle or perch 144 is preferably formed in the upper container section 110 in radial alignment with each feeder opening 138 to facilitate feeding as well as handling the hummingbird feeder 100.

Figure 12:
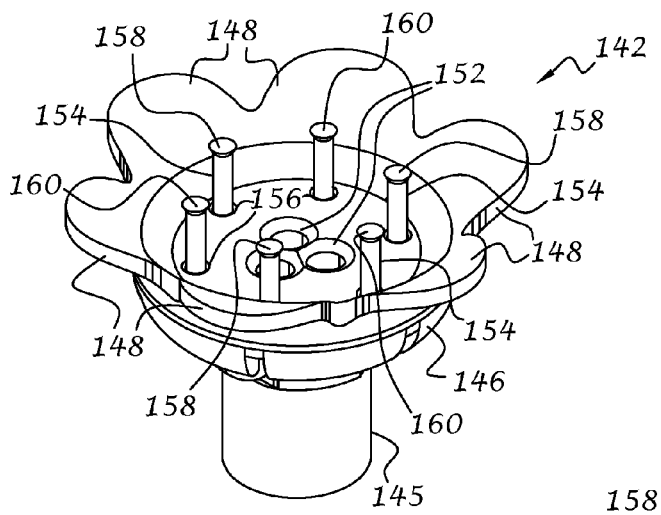
FIG. 12 is a top isometric view of an illuminated flower that forms part of the hummingbird feeder of FIG. 8.
Figure 13:
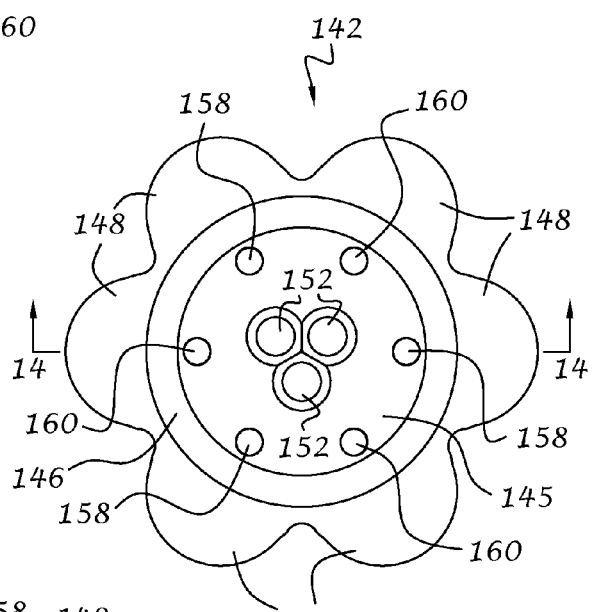
FIG. 13 is top plan view of the illuminated flower.
Figure 14:
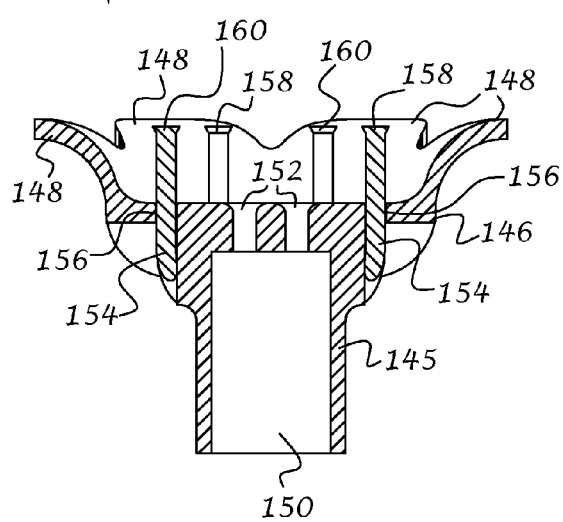
FIG. 14 is a sectional view of the illuminated flower taken along line 14-14 of FIG. 13.

As best shown in FIGS. 9 and 12-14, each artificial feeding flower 142 preferably includes an annular base or stem portion 145 and a flower portion 146 formed as a continuous side wall that extends upwardly and outwardly from the stem portion. The upper end of the side wall is shaped to form petals 148 that preferably curve radially outwardly and upwardly. The stem portion 145 is preferably sized to fit within the opening 138 (FIG. 11) of the upper container section 110 and includes a bore 150 in fluid communication with the hollow interior 118 of the lower container section 108. The stem portion 145 preferably engages the annular mounting flange 140 in a frictional fit. It will be understood that the flower 142 can be connected to the upper container section 110 through other connection means such as adhesives, mechanical fasteners, and so on. A plurality of centrally located apertures 152 communicate with the bore 150 and are sized to receive the beak of a hummingbird or the like (not shown) so that food available in the hollow interior 118 can be accessed.

A plurality of light emitting elements 154 are preferably associated with the stem portion 145. Each light emitting element is preferably in the form of an elongate fluorescent-doped optical fiber that has been bent or otherwise formed into a "U" shape. The legs of each optical fiber extend through openings 156 formed in the stem portion 145. The opposing enlarged ends 158, 160 of each optical fiber 154 are preferably enlarged by heating the ends to thereby create a lens for projecting light at a greater conical angle out of the optical fiber for an enhanced lighting effect. The optical fibers are thus formed to simulate flower stamens with the legs of each optical fiber representing a filament and the enlarged ends representing the anther. Since typical flowers have six stamens, three light emitting elements 154 are preferably used. With the apertures 152 located centrally between the stamens, the apertures simulate the flower style through which the nectar is accessed. It will be understood that more or less lighting elements can be used without departing from the spirit and scope of the invention.

With the above-described arrangement, the loop portions of the optical fibers 154 of the artificial feeding flowers 142 of the hummingbird feeder 100 are exposed to ambient light, such as the sun or nearby artificial light sources, to thereby illuminate the ends 158, 160 of the optical fibers. The illuminated ends 158, 160 will appear as point sources of light, all without the need for solar panels, batteries or other electrical power supplies. This effect is especially noticeable during low light ambient conditions such as at dusk or dawn. However, as in the previous embodiment, it will be understood that one or more lighting elements 154 may be in the form of tritium capsules, or other light emitting elements such as LED's or incandescent bulbs that may require a power source.

Figure 15:
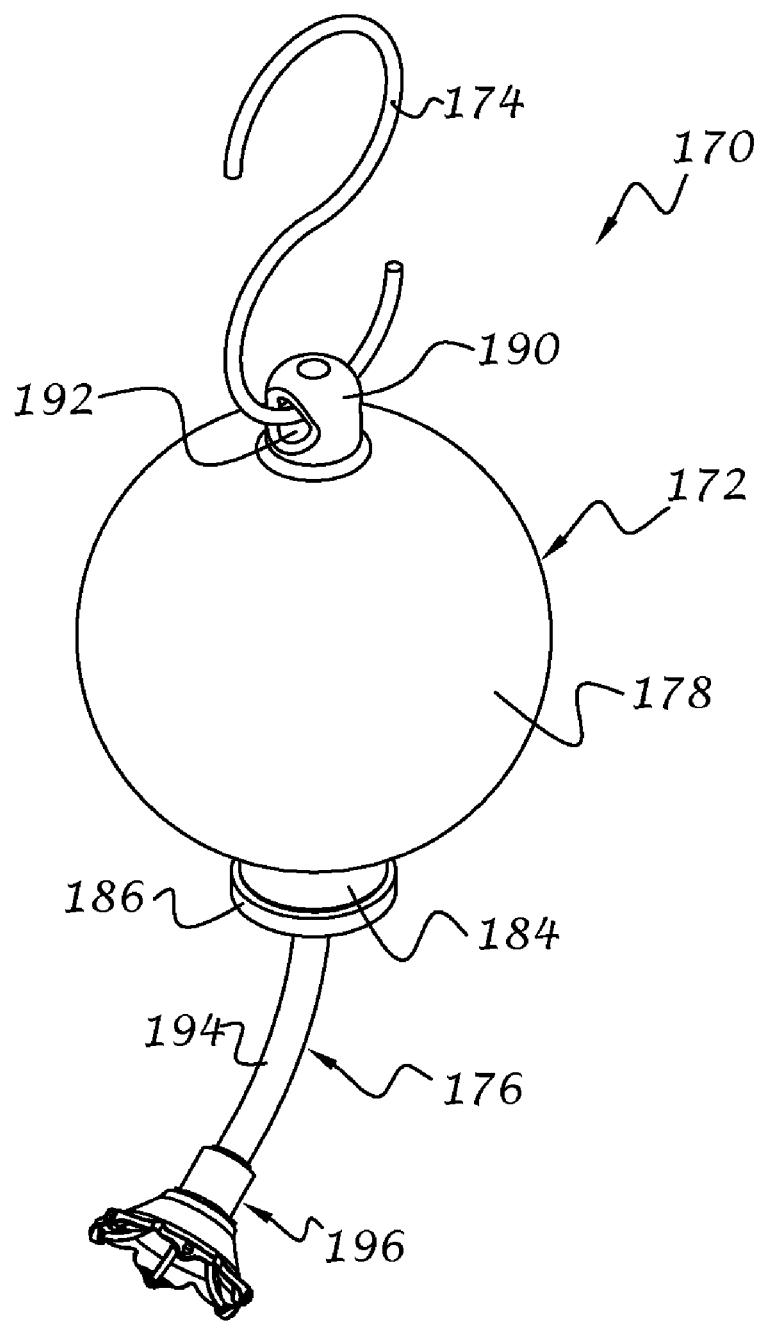
FIG. 15 is a top isometric view of an illuminated hummingbird feeder in accordance with yet another embodiment of the present invention.
Figure 16:
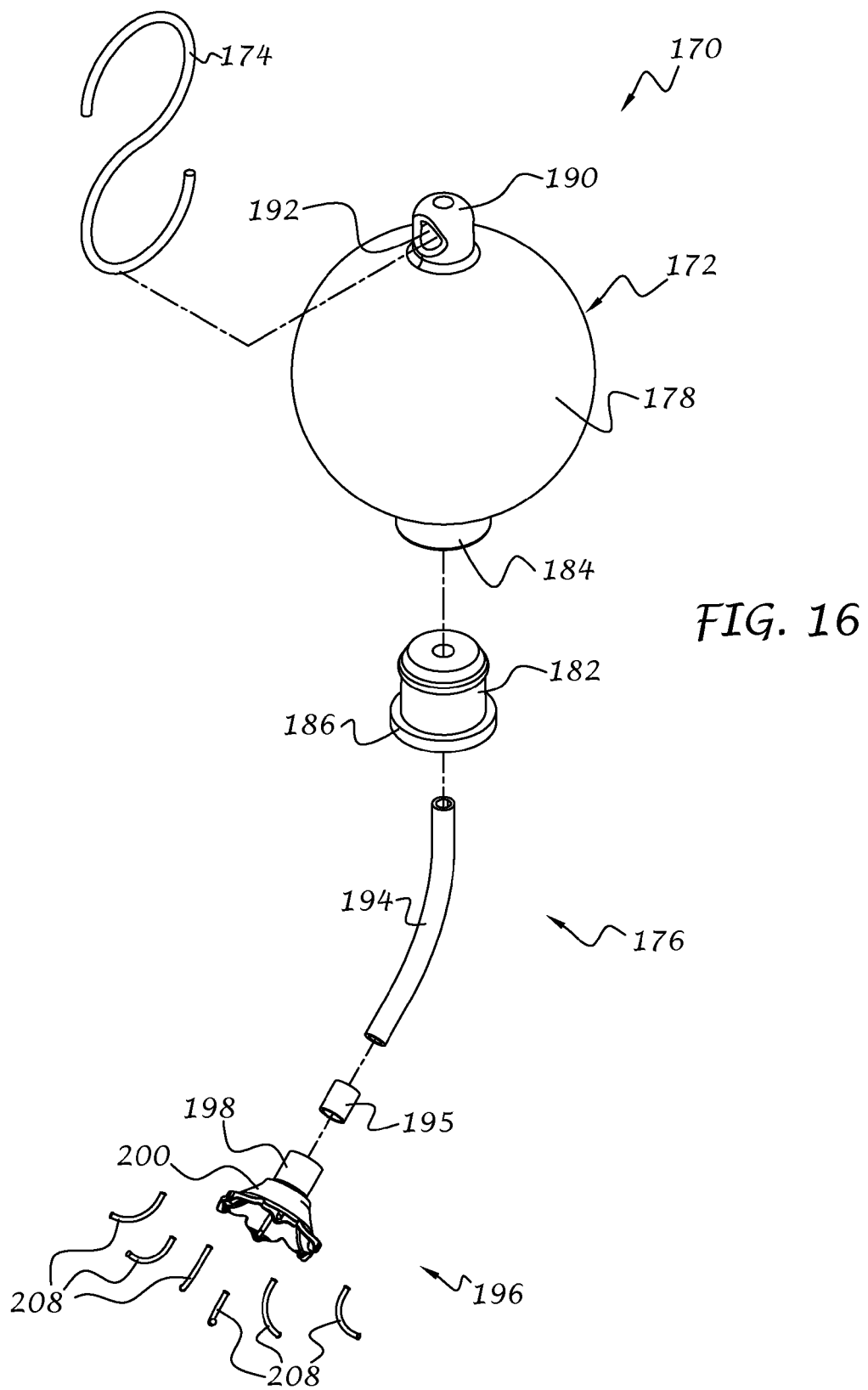
FIG. 16 is an exploded top isometric view thereof.
Figure 17:
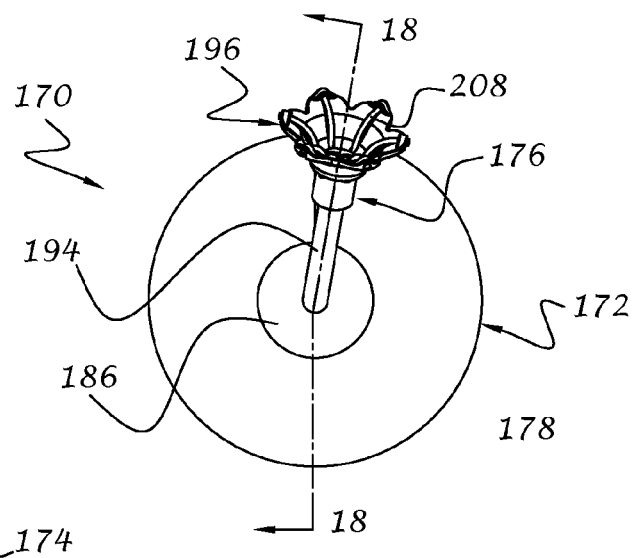
FIG. 17 is a bottom plan view thereof.
Figure 18:
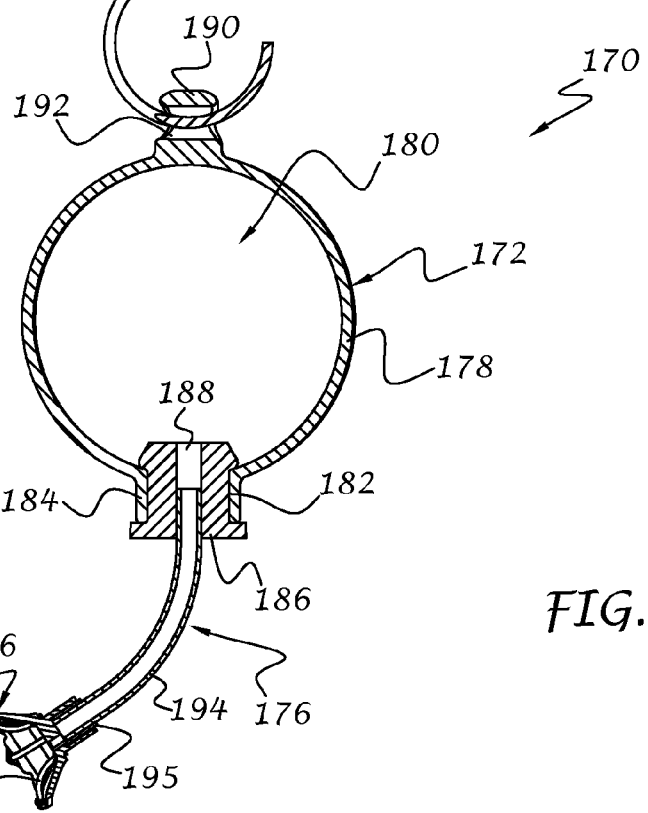
FIG. 18 is sectional view of the illuminated hummingbird feeder taken along line 18-18 of FIG. 17.

Turning now to FIGS. 15-18, an illuminated hummingbird feeder 170 in accordance with yet a further embodiment of the present invention is illustrated. The hummingbird feeder 170 preferably includes a housing portion 172, a hanger portion 174 extending generally upwardly from the housing portion, and a feeder portion 176 extending generally downwardly from the housing portion.

The housing portion 172 preferably includes a spherical container 178 that forms a hollow interior 180 (FIG. 18) for holding a quantity of nectar or other liquids for hummingbirds or the like. An opening 182 is formed at a lower end of the container 178 and an annular flange 184 surrounds the opening. A plug 186, preferably made of an elastomer or other resilient material, fits within the opening to create a fluid-tight seal. A bore 188 is formed in the plug 186 for delivering food to the feeder portion 176 from the container 178. A projection 190 extends upwardly from the container 178 and includes an opening 192 for receiving the hanger portion 174, which is preferably in the form of an S-shaped hook. The housing portion 172 can be constructed as a single unit or multiple segments and can be made of any suitable material such as plastic, glass, metal, and so on. In one preferred embodiment of the invention, the housing portion 172 is constructed of a transparent or translucent plastic material through blow-molding or other forming techniques so that the level of food within the hollow interior 180 can be ascertained.

The feeder portion 176 preferably includes a hollow feeding tube 194 that extends into the bore 188 of the plug 186 and an artificial feeding flower 196 arranged at an outer free end of the tube. A sleeve 195 is preferably positioned between the tube 194 and the flower 196. The tube 194 is preferably curved to orient the flower 196 at a convenient position for use by hummingbirds or the like.

With particular reference to FIGS. 16 and 8-21, the artificial feeding flower 196 is similar in construction to the artificial feeding flower 54 previously described, and preferably includes an annular base or stem portion 198 and a flower portion 200 formed as a continuous side wall that extends upwardly and outwardly from the stem portion, as viewed in FIGS. 19 and 21. The upper end of the side wall is shaped to form petals 202 that preferably curve radially outwardly and upwardly. The stem portion preferably includes a bore 204 sized to receive the feeding tube 194 and sleeve 195 in a frictional fit and a plurality of centrally located apertures 206 that communicate with the bore 204. It will be understood that the flower 196 can be connected to the tube 194 through other connection means such as adhesives, mechanical fasteners, and so on. The apertures 206 are sized to receive the beak of a hummingbird or the like (not shown) so that food available in the bore 204 can be accessed.

A light emitting element 208 is preferably associated with each petal 202. As in the first embodiment, each light emitting element is preferably in the form of an elongate fluorescent-doped optical fiber that extends through a hole 210 formed in the stem portion 198 and along a groove 212 formed in the petal 202. A retaining block 214 extends across each groove 212 to retain the optical fiber within the groove. Opposing ends 216, 218 of each optical fiber 208 are preferably enlarged by heating the ends to retain the fiber optic on the flower 196 and to create a lens for projecting light at a greater conical angle out of the fiber optic for an enhanced lighting effect.

The passive illumination features as described above enables sighting hummingbird feeders in low light conditions that do not rely on the more costly electrical assemblies of the prior art. The provision of passive illumination features on the artificial flowers aids in directing the eye to the center of the flower where access to the contents of the feeder is available.

It will be understood that the term "preferably" as used throughout the specification refers to one or more exemplary embodiments of the invention and therefore is not to be interpreted in any limiting sense. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. For example, although the above-described hummingbird feeders are shown with separate housing and feeder portions, the housing and feeder portions can be integrally molded or otherwise formed as a single housing for both storing and delivering a quantity of food without departing from the spirit and scope of the present invention.

In addition, the one or more passive illumination devices need not be associated only with one or more ornamental flowers or other ornamental features, but may alternatively or additionally be associated with other portions of the feeders, such as the housing and/or hanger portions without departing from the spirit and scope of the present invention.

In addition, passive illumination devices can be associated with other bird feeders besides the above-described embodiments. By way of example, one or more passive illumination devices can be associated with other bird feeders having a housing for holding and delivering a quantity of food, such as bird seed, so that the food can be stored and accessed by birds or other creatures as needed.

The provision of one or more passive illumination devices to any type of bird feeder not only creates an aesthetically pleasing effect to the observer, but can also serve to attract insects or the like under low light conditions to help supply hummingbirds or other birds with a live food source.

It will be understood, therefore, that this invention is not limited to the particular embodiments disclosed, but also covers modifications within the spirit and scope of the present invention as defined by the appended claims.

We claim:

1. An illuminated hummingbird feeder comprising:
a housing portion for holding a quantity of liquid;
a feeder portion comprising at least one artificial feeding flower fluidly connected to the housing portion; and
at least one elongate passive illumination device associated with the at least one artificial feeding flower, the at least one elongate passive illumination device being operative independent of electrical power to create at least one point source of light when ambient light is incident along a length of the elongate passive illumination device to thereby illuminate the at least one artificial feeding flower; wherein the at least one passive illumination device comprises a fluorescent-doped optical fiber connected to the flower, the optical fiber having at least one exposed end such that ambient light incident along the length of the optical fiber causes illumination of the at least one exposed end.

2. An illuminated hummingbird feeder according to claim 1, wherein the at least one exposed end of the optical fiber is enlarged to increase a viewing angle thereof.

3. An illuminated hummingbird feeder according to claim 1, wherein the at least one artificial feeding flower includes a plurality of petals and the at least one elongate passive illumination device comprises a plurality of elongate passive illumination devices extending along the petals.

4. An illuminated hummingbird feeder according to claim 3, wherein each of the plurality of elongate passive illumination devices comprises a fluorescent-doped optical fiber connected to one of the petals, each optical fiber having at least one exposed end such that ambient light incident along the length of the optical fiber causes illumination of the at least one exposed end.

5. An illuminated hummingbird feeder according to claim 4, wherein the at least one exposed end of each optical fiber is enlarged to increase a viewing angle thereof.

6. An illuminated hummingbird feeder according to claim 1, wherein the at least one artificial feeding flower comprises:
a base; and
a flower portion extending upwardly from the base;
wherein the at least one elongate passive illumination device comprises a plurality of elongate passive illumination devices extending upwardly from the base.

7. An illuminated hummingbird feeder according to claim 6, wherein each of the plurality of elongate passive illumination devices comprises a fluorescent-doped optical fiber, each optical fiber having at least one exposed end such that ambient light incident along the length of the optical fiber causes illumination of the at least one exposed end.

8. An illuminated hummingbird feeder according to claim 7, wherein each optical fiber being shaped to represent a flower stamen.

9. An illuminated hummingbird feeder comprising:
a housing portion for holding a quantity of liquid;
a feeder portion comprising at least one artificial feeding flower fluidly connected to the housing portion; and
at least one light emitting member associated with the at least one artificial feeding flower;
wherein the at least one artificial feeding flower comprises:
a base; and
a flower portion extending upwardly from the base;
wherein the at least one light emitting member comprises a plurality of light emitting members extending upwardly from the base; each of the plurality of light emitting members comprising a fluorescent-doped optical fiber, each optical fiber being U-shaped with a pair of legs extending through the base, each leg having an exposed end such that ambient light incident along the length of the optical fiber causes illumination of the at least one exposed end.

10. An illuminated hummingbird feeder according to claim 9, wherein each leg of the optical fiber being shaped to represent a flower stamen.

11. An illuminated hummingbird feeder according to claim 10, wherein the flower portion comprises a plurality of petals extending upwardly from the base.

12. An illuminated bird feeder comprising:
a housing for holding and dispensing a quantity of food, the housing comprising a feeder portion with at least one artificial feeding flower; and
at least one passive illumination device connected to the bird feeder for illuminating a portion of the bird feeder, the at least one passive illumination device being operative independent of electrical power when ambient light is incident along a length of the passive illumination device to create at least one point source of light to thereby illuminate at least a portion of the bird feeder; wherein the at least one passive illumination device comprises a fluorescent-doped optical fiber connected to the at least one artificial feeding flower, the optical fiber having at least one exposed end such that ambient light incident along the length of the optical fiber causes illumination of the at least one exposed end.

13. An illuminated bird feeder according to claim 12, wherein the at least one passive illumination device comprises at least one fluorescent doped optical fiber.

14. An illuminated bird feeder according to claim 12, wherein the at least one exposed end of the optical fiber is enlarged to increase a viewing angle thereof.

15. An illuminated bird feeder according to claim 12, wherein the at least one artificial feeding flower includes a plurality of petals and the at least one passive illumination device comprises a plurality of light emitting members extending along the petals.

16. An illuminated bird feeder according to claim 12, wherein the at least one artificial feeding flower comprises:
   a base; and
   a flower portion extending upwardly from the base;
   wherein the at least one passive illumination device comprises a plurality of light emitting members extending upwardly from the base.

17. An illuminated feeder according to claim 16, wherein each of the plurality of light emitting members comprises a fluorescent-doped optical fiber, each optical fiber having at least one exposed end such that ambient light incident along the length of the optical fiber causes illumination of the at least one exposed end.

18. An illuminated feeder comprising:
   a housing for holding and dispensing a quantity of food; and
   at least one passive illumination device connected to the housing and comprising a fluorescent-doped optical fiber, the optical fiber being U-shaped with a pair of legs, each leg having an exposed end such that ambient light incident along a length of the optical fiber causes illumination of the exposed end.

* * * * *